UNITED STATES PATENT OFFICE 2,544,292

CONDENSATION OF POLYHYDRIC PHENOLS AND POLYHYDRIC ALCOHOLS

Edward S. Blake, Nitro, W. Va., assignor to Monsanto Chemical Company, St. Louis, Mo., a corporation of Delaware No Drawing. Application December 26, 1945, Serial No. 637,288

14 Claims. (Cl. 260—621)

The present invention relates to condensation products of polyhydric phenols and polyhydric alcohols.

In accordance with the present invention it has been found that polyhydric alcohols having two hydroxy groups linked to separate carbon atoms separated by one intervening carbon atom condense with polyhydric phenols in the presence of condensation catalysts. Condensation may be effected by such agents as aluminum chloride, phosphoric acid, sulfuric acid, zinc chloride and the like.

The polyhydric alcohols suitable for use in the practice of this invention contain the nucleus

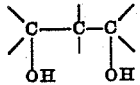

Typical examples of these polyhydric alcohols are 1,3 propane diol, 1,3 butane diol, 2-methyl 1,3-butane diol, 2,4-pentane diol, 2-methyl, 2-4 pentane diol, 1-methyl 1,3-butane diol, 3-methyl 2,4-pentane diol and 2,4-dimethyl 2,4-pentane diol.

While the structure of the reaction products is not definitely known, it is virtually certain that at least two molecular proportions of the polyhydric alcohol condense with one molecular proportion of the polyhydric phenol. The ratio of both the catalyst and polyhydric alcohol to polyhydric phenol can be varied quite widely, without seriously altering the product. For example, in a series of preparations in which concentrated sulfuric acid was employed as the condensing agent, the ratio of catalyst was kept constant at 80 parts by weight per molecular weight of hydroquinone and the ratio of alcohol varied from 1.8 mols to 3.4 molecular weights in approximately 10 per cent increments. The alcohol employed was 2-methyl 2,4-pentane diol and so far as could be determined, the product was substantially identical in each case. The yield, however, gradually increased with increasing amounts of alcohol.

In another series of experiments 27 parts by weight of hydroquinone was treated with 80 parts by weight of 2-methyl 2,4-pentane diol in the presence of varying amounts of concentrated sulfuric acid catalyst. There was no significant change in yield so long as at least 8 parts by weight of catalyst was employed although the yield fell off sharply with 1.5 parts by weight of catalyst. The products were for the most part sirupy liquids but excessive amounts of sulfuric acid catalyst resulted in the formation of small amounts of solid products. Since for most purposes a single uniform product is desired, it is generally desirable to eliminate these solid constituents. They can of course be separated by filtration after crystallization takes place but by suitable adjustment of the ratio of catalyst it is possible to prevent their appearance entirely. Thus, a uniformly liquid product was obtained by employing substantially 40 parts by weight of 95% sulfuric acid catalyst per molecular weight of polyhydric phenol, from which no crystals separated on long standing in the cold after seeding with a crystal of the solid separated from other preparations. The optimum ratio of the reactants for the production of a crystal free liquid is 2.71 mols of 2-methyl 2,4-pentane diol and 0.388 mol of concentrated sulfuric acid per mol of hydroquinone.

The reactions are exothermic and are characterized by considerable vigor. One or both of the reactants may be dissolved or suspended in an inert carrying medium or the phenol treated with the alcohol undiluted. Suitable diluents comprise benzene, toluene, xylene, and low boiling petroleum fractions. The condensations take place over a wide temperature range as for example room temperature to 150° C. although the temperature should be kept below 100° C. for the production of sirupy liquids. At higher temperatures tacky, highly viscous liquids or solids are formed, possibly as the result of polymerization.

The following specific examples illustrate the preparation of the compounds in detail but are not to be taken as limitative of the invention.

Example I

Into a suitable reactor fitted with a thermometer, stirrer and condenser, and provided with an arrangement for cooling the reactor contents, there was charged 800 parts by weight of petroleum hydrocarbon solvent, 280 parts by weight of 2-methyl 2,4-pentane diol and 110 parts by weight of hydroquinone. 40 parts by weight of concentrated sulfuric acid was then added and the mixture gradually heated with stirring to about 70° C. A vigorous reaction set in as the charge was heated. Stirring was continued for about 50 minutes at 75–78° C. and the lower acid layer was drawn off and discarded. The solvent layer was washed with water and then bicarbonate solution until neutral, dried, filtered and the solvent removed by distillation. Any unreacted constituents not washed out were then removed by distillation up to 93° C. vapor temperature at 7 mm. pressure. The composite reaction product consisted of 240 parts by weight of a thick dark amber liquid from which no crystalline material could be isolated.

While the chemical structure of the reaction product is uncertain, the active hydrogen determined by Zerewitinoff's method of methane evolution indicated that the product contains only one free hydroxyl group.

Example II

A reactor with an arrangement for cooling the contents and fitted with a thermometer, stirrer and reflux condenser was charged with 55 parts by weight of resorcinal, 158 parts by weight of 2-methyl 2,4-pentane diol and 200 parts by weight of a petroleum hydrocarbon solvent. 40 parts by weight of concentrated sulfuric acid was then slowly added and the charge heated carefully. The reaction was particularly vigorous at 70° C., cooling being required. After heating at 70–75° C. for about an hour, the bottom acid layer was drawn off and the solvent layer washed with dilute sodium bicarbonate solution until neutral, dried and filtered. The solvent was removed by distillation and the residue freed from constituents of high volatility by topping up to 93° C. at 3 mm. pressure. The desired reaction product was obtained as a clear light amber soft resinous product. The yield was 141 parts by weight.

Example III

The resorcinol of Example II was replaced by 55 parts by weight of catechol and the example repeated as described. The reaction was less vigorous and the yield somewhat less. 132 parts by weight of a dark amber viscous oil was obtained.

Other polyhydric phenols as for example 1,4 dihydroxy naphthalene, 1,5 dihydroxy naphthalene, pyrogallol and the like may be condensed with a polyhydric alcohol to produce the new products.

The new substances may be put to a variety of uses. They are effective antioxidants, particularly of substances which deteriorate by absorption of oxygen from the air as for example rubber, fatty oils, gasoline, soap, turpentine, aldehydes, synthetic resins, and insecticides such as derris root, cube root, and pyrethrum. They may be used as plasticizers and solvents and as intermediates for the preparation of synthetic resins. Compounds claimed herein are claimed as rubber antioxidants in application Serial No. 637,093, filed December 22, 1945, now U. S. Patent 2,469,101.

The present invention is limited solely by the claims attached hereto as part of the present specification.

What is claimed is:

1. The product having at least one but less than two hydroxyl groups comprising in chemical combination one molecular proportion of a dihydric phenol and substantially two molecular proportions of a dihydric alcohol obtained by reacting below 100° C. in the presence of a condensation catalyst a dihydric phenol and a dihydric alcohol of at least four carbon atoms containing the nucleus

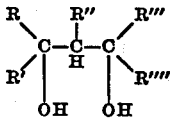

where R, R', R'', R''' and R'''' are selected from a group consisting of hydrogen and methyl groups.

2. The product having at least one but less than two hydroxyl groups comprising in chemical combination one molecular proportion of a dihydroxy substituted benzene and substantially two molecular proportions of a dihydric alcohol obtained by reacting below 100° C. in the presence of a condensation catalyst a dihydroxy substituted benzene and a secondary tertiary dihydric alcohol having the two hydroxyl groups linked to separate carbon atoms separated by a methylene group.

3. The product having at least one but less than two hydroxyl groups comprising in chemical combination one molecular proportion of hydroquinone and substantially two molecular proportions of a dihydric alcohol obtained by reacting below 100° C. in the presence of a condensation catalyst hydroquinone and a secondary, tertiary dihydric alcohol having the two hydroxyl groups linked to separate carbon atoms separated by a methylene group.

4. The product having at least one but less than two hydroxyl groups comprising in chemical combination one molecular proportion of a dihydroxy substituted benzene and two molecular proportions of a dihydric alcohol obtained by reacting below 100° C. in the presence of a condensation catalyst a dihydroxy substituted benzene and a dihydric alcohol having the two hydroxyl groups linked to separate carbon atoms separated by a methylene group at least one of the hydroxyl groups being linked to a tertiary carbon atom.

5. The product having at least one but less than two hydroxyl groups comprising in chemical combination one molecular proportion of a dihydric phenol and substantially two molecular proportions of 2-methyl 2,4-pentane diol obtained by reacting below 100° C. in the presence of a condensation catalyst a dihydric phenol and 2-methyl 2,4-pentane diol.

6. The product having at least one but less than two hydroxyl groups comprising in chemical combination one molecular proportion of hydroquinone and two molecular proportions of 2-methyl 2,4-pentane diol obtained by reacting below 100° C. in the presence of a condensation catalyst hydroquinone and 2-methyl 2,4-pentane diol.

7. The product having at least one but less than two hydroxyl groups comprising in chemical combination one molecular proportion of hydroquinone and two molecular proportions of 2-methyl 2,4-pentane diol obtained by reacting below 100° C. in the presence of sulfuric acid condensation catalyst hydroquinone and 2-methyl 2,4-pentane diol.

8. The process which comprises reacting below 100° C. in the presence of a condensation catalyst one molecular proportion of a dihydric phenol and substantially two molecular proportions of a dihydric alcohol of at least four carbon atoms containing the nucleus

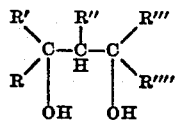

wherein R, R', R'', R''' and R'''' are selected from a group consisting of hydrogen and methyl groups and isolating a product containing at least one but less than two hydroxyl groups.

9. The process which comprises reacting below 100° C. in the presence of a condensation catalyst one molecular proportion of a dihydroxy substituted benzene and substantially two molecular proportions of a secondary, tertiary dihydric alcohol having the two hydroxyl groups linked to separate carbon atoms separated by a methylene group.

10. The process which comprises reacting below 100° C. in the presence of a condensation catalyst one molecular proportion of hydroquinone and substantially two molecular proportions of a dihydric alcohol having the two hydroxyl groups linked to separate carbon atoms separated by a methylene group one hydroxyl being linked to a tertiary carbon and the other to a secondary carbon and isolating a product containing at least one but less than two hydroxyl groups.

11. The process which comprises reacting below 100° C. in the presence of a condensation catalyst one molecular proportion of a dihydroxy substituted benzene and substantially two molecular proportions of a dihydric alcohol having the two hydroxyl groups linked to separate carbon atoms separated by a methylene group at least one of the hydroxyl groups being linked to a tertiary carbon atom and isolating a product containing at least one but less than two hydroxyl groups.

12. The process which comprises reacting below 100° C. in the presence of a condensation catalyst one molecular proportion of a dihydric phenol and substantially two molecular proportions of 2-methyl 2,4-pentane diol and isolating a product containing at least one but less than two hydroxyl groups.

13. The process which comprises reacting below 100° C. in the presence of a condensation catalyst one molecular proportion of hydroquinone and substantially two molecular proportions of 2-methyl 2,4-pentane diol and isolating a product containing at least one but less than two hydroxyl groups.

14. The process which comprises reacting below 100° C. in the presence of sulfuric acid condensation catalyst one molecular proportion of hydroquinone and substantially two molecular proportions of 2-methyl 2,4-pentane diol in the presence of at least 0.08 molecular proportions of $H_2SO_4$ and isolating a product containing at least one but less than two hydroxyl groups.

EDWARD S. BLAKE.

REFERENCES CITED

The following references are of record in the file of this patent:

UNITED STATES PATENTS

| Number | Name | Date |
|---|---|---|
| 2,109,015 | Niederl et al. | Feb. 22, 1938 |
| 2,198,374 | Bruson | Apr. 23, 1940 |